United States Patent [19]

Campbell et al.

[11] Patent Number: 4,586,783

[45] Date of Patent: May 6, 1986

[54] SIGNAL COUPLER FOR BUFFERED OPTICAL FIBERS

[75] Inventors: Bruce D. Campbell; Robert J. Naidoff, both of Portola Valley; Richard E. Tylor, Fremont, all of Calif.

[73] Assignee: Raychem Corporation, Menlo Park, Calif.

[21] Appl. No.: 496,797

[22] Filed: May 23, 1983

[51] Int. Cl.$^4$ .............................................. G02B 6/26
[52] U.S. Cl. .................................................. 350/96.15
[58] Field of Search ................ 250/227; 350/96.15, 350/96.16

[56] References Cited

U.S. PATENT DOCUMENTS

| 3,936,631 | 2/1976 | Muska | 350/96.15 |
| 4,135,780 | 1/1979 | Dyott | 350/96.15 |
| 4,253,727 | 3/1981 | Jeunhomme et al. | 350/96.15 |
| 4,268,116 | 5/1981 | Schmadel et al. | 350/96.29 |

Primary Examiner—John Lee
Assistant Examiner—Lester Rushin, III
Attorney, Agent, or Firm—Dennis E. Kovach; Herbert G. Burkard

[57] ABSTRACT

A signal coupler for buffered optical fibers comprises a soft, transparent, polymeric rod against which the fiber is pressed by a rigid "key" having regularly spaced protrusions which induce periodic microbending of the fiber. An optical signal passing down the fiber may be coupled into the polymeric rod by the key pressing the fiber into the rod, and the signal extracted from the end of the rod. A similar process may be used to inject an optical signal into the fiber. The coupler may be used either as a termination for a fiber or as part of a non-destructive tap. The induced attenuation and the intensity of the extracted signal may be varied by varying the pressure on the key.

18 Claims, 6 Drawing Figures

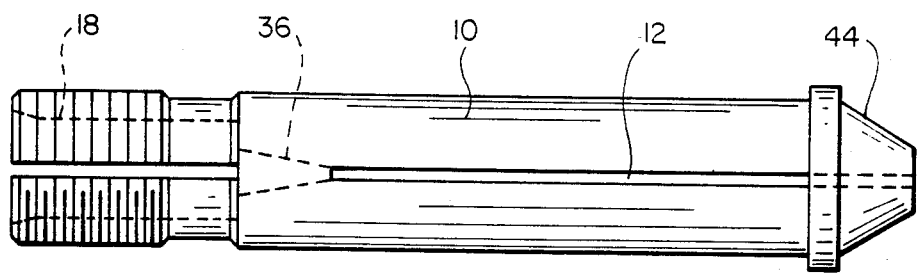
FIG_1
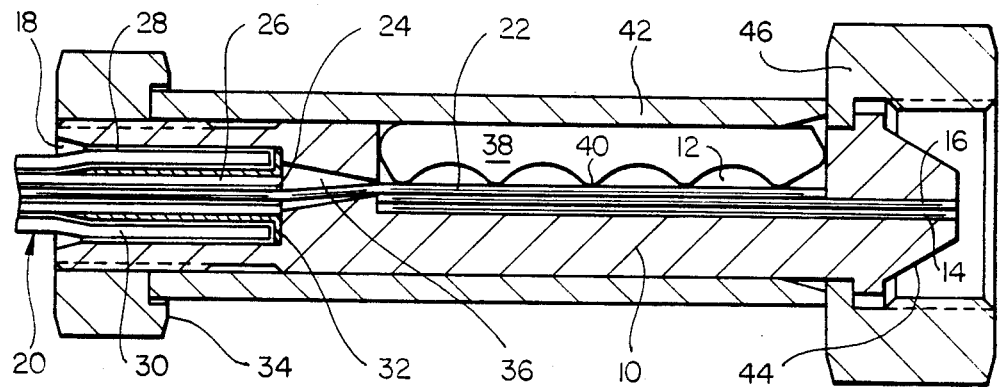
FIG_2
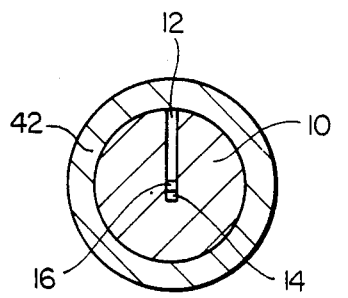
FIG_3
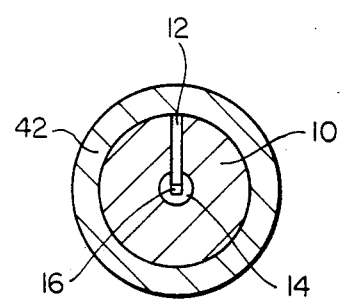
FIG_4

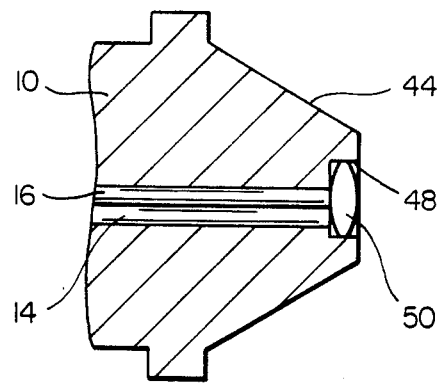
FIG_5
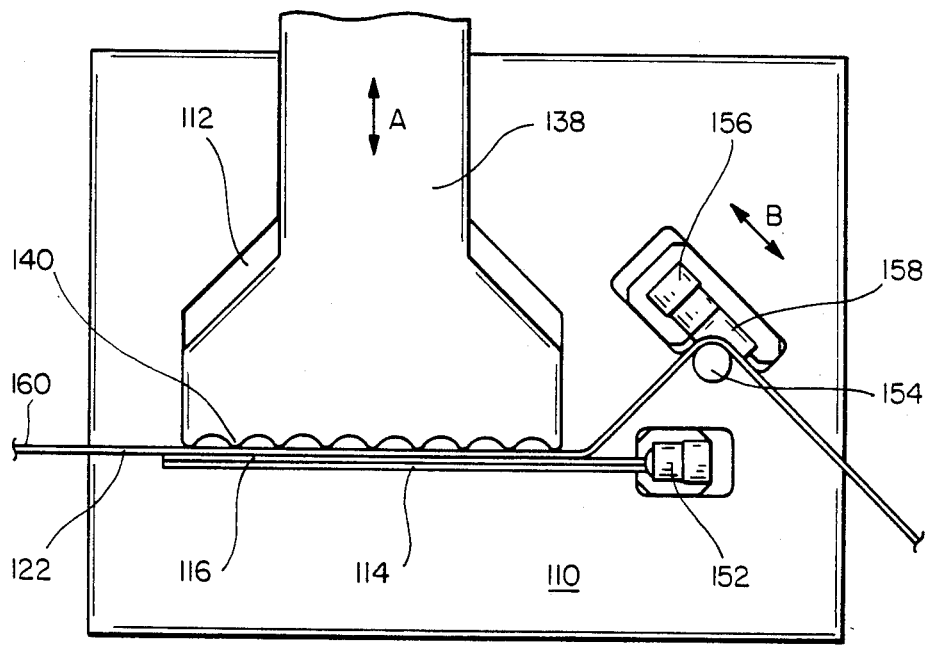
FIG_6

SIGNAL COUPLER FOR BUFFERED OPTICAL FIBERS

FIELD OF THE INVENTION

This invention relates to optical signal couplers for optical fibers, and especially to a signal coupler for use with buffered optical fibers.

BACKGROUND TO THE INVENTION

It is known (see, for example, U.S. Pat. Nos. 3,931,518 (Miller) and 4,135,780 (Dyott), the disclosures of which are incorporated herein by reference, and the references cited therein, that it is possible to cause coupling of the guided modes (i.e. those modes that propagate in the core of an optical fiber) and the radiation modes (i.e. those modes that propagate in the cladding). These two patents referred to above make use of this mode coupling to enable the withdrawal of an optical signal from an optical fiber comprising a core and a cladding by first coupling the signal (or a part thereof) from the core into the cladding and then withdrawing the signal from the cladding by some suitable tap. This tap may be, for example, a pair of disks, one hard and one soft, between which the clad fiber is compressed (as in Miller), or a relatively large cross-section glass rod against which a straight section of the fiber lies and to which it is optically coupled by a liquid or jelly-like coupling material (as in Dyott).

The mode coupling is induced by the introduction of periodic microbends into the fiber, as is discussed in, for example, the Miller patent referred to above.

In U.S. Pat. No. 4,253,727 (Jeunhomme et al.), the disclosure of which is incorporated herein by reference, there is disclosed a technique for the extraction of light from, or injection of light into, a clad optical fiber in which both the mode coupling and signal extraction/injection is performed by a single device. This device comprises a longitudinally split glass cylinder having mode coupling means on the mating surfaces of the two halves between which the fiber is held and optical end surface(s) which are cones of revolution.

However, these techniques do not appear to have found wide application, and a possible explanation for this is that a fiber with the buffer removed, i.e. a fiber comprising only core and cladding, is much weaker than the same fiber with a buffer. This weakness manifests itself both as a much greater tendency to break when bent (a buffered fiber can stand much tighter bends and repeated bends better than an unbuffered one) and a tendency to stresscracking (because the hydrolytic attack on the unbuffered fiber is particularly prone to occur at bends where microcracks may be formed). Both of these factors limit the usefulness of any technique which operates on unbuffered fibers, especially when it is desired to be able to repeatedly connect and disconnect the optical coupler.

In U.S. patent application Ser. No. 437,054 filed Oct. 27, 1982 (Beals et al.), the disclosure of which is incorporated herein by reference, there is disclosed an optical fiber tap which does not interrupt the physical continuity of the tapped fiber. The tap, which is especially useful as a node in a ring topology data processing network comprises means for withdrawing signals from and introducing them into a buffered optical fiber through a microbend (this technique being disclosed in U.S. patent application Ser. Nos. 370,321, filed Apr. 21, 1982, abandoned; and continuation Application Ser. No. 437,053, filed Oct. 27, 1982 (Campbell et al.); the disclosures of which are incorporated herein by reference. The tap also comprises a signal attenuation means, located between the receiver and transmitter sections, which may be, for example, a means for introducing a series of microbends into the fiber.

SUMMARY OF THE INVENTION

We have discovered that it is possible to produce a signal coupler for buffered optical fibers which comprises a soft, transparent, polymeric rod against which the fiber is pressed by a rigid "key" having regularly spaced protrusions which induce periodic microbending of the fiber. An optical signal passing down the fiber may be coupled into the polymeric rod by the key pressing the fiber into the rod and the signal extracted from the end of the rod. A similar process may be used to inject an optical signal into the fiber. The coupler may be used either as a termination for a fiber or as part of a non-destructive tap. The induced attenuation and the intensity of the extracted signal may be varied by varying the pressure on the key.

BRIEF DESCRIPTION OF THE DRAWING

The invention in various embodiments is illustrated in the accompanying drawing, in which FIG. 1 is a plan view of a terminator for a buffered optical fiber which employs the coupler of this invention, FIG. 2 is a longitudinal cross-sectional elevation corresponding to FIG. 1 but showing a fiber terminated within the terminator, FIGS. 3 and 4 are cross-sectional views perpendicular to FIGS. 1 and 2, and FIG. 5 is a partial cross-section corresponding to FIG. 2 but showing the use of a lens.

FIG. 6 is an elevation of an optical fiber tap which employs the coupler of this invention.

DETAILED DESCRIPTION OF THE INVENTION

In a first aspect, this invention provides a signal coupler for a buffered optical fiber which comprises:

(a) a soft, transparent, polymeric rod of crosssection at least as great as the buffered fiber;

(b) rigid backing means for the polymeric rod;

(c) a rigid key having regularly spaced protrusions on a surface thereof; and (d) compression means for urging that surface of the key having the protrusions against the fiber to force it into contact with the polymeric rod and induce optical coupling between the fiber and the rod.

The coupler may be provided with an optical signal transmitter (e.g. an LED or laser diode) or receiver (e.g. a phototransistor or p-i-n diode) located adjacent an end of the polymeric rod and capable of being optically coupled thereto.

In a second aspect this invention provides a method for optically coupling light into or out of a buffered optical fiber which comprises positioning the fiber within the coupler of this invention and urging the key against the fiber to cause coupling.

In a first principal embodiment, this invention provides a reusable terminator for a buffered optical fiber which comprises the coupler of this invention in a suitable holder, especially one which is readily mechanically mateable to optical transmitters or receivers and- /or which is provided with means for mechanical termination of an optical fiber cable.

In a second principal embodiment, this invention provides an optical fiber tap similar to that disclosed in U.S. patent application Ser. No. 437,054 referred to previously but which employs the coupler of this invention as both the detecting and signal attenuating means.

Particular advantages of the coupler of this invention include that (a) it is non-destructive, i.e. the fiber may remain in a continuous length; (b) the extent of coupling may easily be varied by e.g. changing the pressure applied to the key, the number and/or spacing of the protrusions on the key surface, or the length of fiber in contact with the key; (c) even for termination, no particular treatment of the fiber end is required (it may be cut with virtually any tool, as the end surface is not employed); and (d) because the fiber need not be stripped of its buffer (since the signals may be passed through the buffer of the fiber into and out of the fiber) the fiber is less subject to breakage or environmental damage.

Optical fibers for telecommunications and data processing applications are generally of the glass-on-glass type, comprising a glass core (through which the optical signals travel), a glass cladding of a lower refractive index surrounding the core to enable it to act as a waveguide, and a relatively soft polymeric buffer, generally of a refractive index greater than the cladding, which surrounds the cladding. The buffer protects the cladding and the core and allows the fiber to be bent into (and maintained in) a bend of substantially smaller radius than would otherwise be possible. In the case of plastic-clad silica (PCS) fibers, which are contemplated especially for military use, and all-plastic fibers, the buffer and cladding may be the same. The buffer may be surrounded by a jacket. It is possible, by the use of the coupler of this invention, to couple optical signals into or out of an optical fiber through the buffer.

FIG. 1 is a plan view of a terminator for an optical fiber employing the coupler of this invention. The terminator body 10, which is cylindrical in cross-section, has a keyway 12 at the bottom of which lies the transparent rod along which will pass light coupled into/out of the optical fiber inserted therein, and into which (above the fiber) will be fitted the key which induces the coupling.

FIG. 2 is a longitudinal cross-sectional elevation corresponding to FIG. 1 but showing a fiber terminated within the terminator. Within the terminator body, in the keyway 12, is a rigid backing means 14, and, above that backing means 14, a polymeric rod 16. The polymeric rod 16 is placed so as to be centered within the terminator body 10, so that rotational alignment of the terminator is unnecessary.

Within a recess 18 at the rear of the terminator body, an optical fiber cable 20 is shown terminated. The cable 20 comprises a buffered optical fiber 22, first reinforcing means 24, inner jacket 26, second reinforcing means 28, and outer jacket 30. The reinforcing means 24 and 28 are typically of braid (e.g. Kevlar), and the jackets 26 and 30 of a polymeric material.

The cable has been terminated by being cut back so that when the end of the fiber 22 reaches the front of the keyway 12, the first reinforcing means 24 and inner jacket 26 reach the end of the recess 18. Outer jacket 30 is cut back slightly further, and second reinforcing means is left long so that it can be bent back over the outer jacket when an inner sleeve 32, generally of metal, is forced between inner jacket 26 and second reinforcing means 28. The cable is then locked in place by compression nut 34 compressing the terminator body (which has generally been slit to facilitate deformation) onto the cable, with the inner sleeve 32 preventing compression of the fiber 22 itself.

Any suitable termination means may be used, and the above is merely exemplary.

The fiber 22, as mentioned before, passes through a passage 36 from the recess 18 into the keyway 12, and key 38, having microbend-inducing protrusions 40, lies on top of that part of it which is in the keyway. The key may be either free or, preferably, retained in the keyway by e.g. a pin passing through it perpendicular to the keyway axis. Compression cover 42 urges the key 38 against the fiber 22, optically coupling the fiber core with rod 16. The optimum shape and spacing of protrusions 40 may be determined either by experiment and/or by reference to the literature, e.g. the Jeunhomme patent and references therein. The spacing is preferably 0.5 to 5 mm, especially 1 to 2.5 mm.

The key 38 and rod 16 serve the additional purpose of holding the buffered fiber end firmly in place in the keyway independently of any retaining means holding the reinforcing braid. This is especially important when loose-tube fibers are employed, as the mechanical coupling between the fiber and the cable is minimal.

The front 44 of the terminator may be shaped to allow ready mechanical mateability with a receptacle holding, e.g. an LED or similar optical transmitter or a phototransistor or similar detector, and may be fitted with an inner-threaded nut 46 to hold the terminator to such a receptacle.

It will be noted that the end of the fiber plays no part in this termination since the coupler which is the core of the terminator couples light through the "side" of the fiber, i.e. through the cladding and buffer.

FIGS. 3 and 4 are cross-sectional views perpendicular to FIGS. 1 and 2 showing the axial arrangement of the coupler. In FIG. 3, the rigid backing means 14 is seen at the bottom of keyway 12 of the terminator body 10, with the polymeric rod 16 lying on top of it and being axially centered within body 10. FIG. 4 shows an alternative, and preferable, arrangement in which rod 16 and backing means 14 form a waveguide in which means 14 acts as the "cladding" of the waveguide and rod 16 as the "core". Of course, a part of the "cladding" 14 is cut away to form the keyway, and allow the fiber to contact rod 16.

It will be realized that it is desirable that the backing means 14 be either highly reflective or relatively transparent to improve its properties as an optical cladding, and be rigid enough that it should not deform when the fiber is pressed against rod 16 (or light will be lost). A suitable material for backing means 14 is e.g. polyvinylidene fluoride. Rod 16 should be transparent, since it is, in effect the "core" of a waveguide, and should be resiliently deformable and softer than the buffer of the fiber desired to be used. A preferable hardness range is about 30 to 90 Shore A. Below about 30 an anomalous coupling effect occurs—the coupling (as measured by light emerging from the end of the rod) increases with increasing force to a certain point and then decreases. It is believed that this is due to loss of light from the rod as it is deformed. Above about 90 coupling increases with increasing force, but the fiber tends to break before very high coupling is achieved as the fiber is simply being compressed between two relatively rigid objects.

The key 38 is preferably of metal or rigid polymer, and, if polymeric, is of a lower refractive index than the buffer; while the rod 16 preferably has a refractive index near that of the buffer, e.g. within ±0.3, preferably ±0.2, especially ±0.1 of the refractive index of the buffer of the fiber. For optimum detection, it is expected that the rod refractive index should be greater than that of the buffer, and for optimum injection of light into the fiber, it should be less. Suitable materials for the rod include, for example, silicones of the type already used conventionally in fiber optics. An example of a suitable material is Shinetsu KE106, which is a two-part RTV silicone. Many other materials are, of course, also suitable within the constraints described above.

FIG. 5 shows an alternative arrangement of the front 44 of the terminator body 10 in which rod 16 is terminated in a recess 48. A lens 50 is mounted in recess 48 to collimate the light emerging from rod 16 and ensure optimum optical coupling with a receptacle into which the front 44 of the terminator is received. If a lens is not employed, it is preferable to form the end of rod 16 to a convex lens shape, also for the purpose of optimizing optical coupling from the rod end. Further, it is possible to shape the rod (and, if necessary, the backing means) so that the end is of optimal size for the detector/transmitter. This may be done, e.g. by gently tapering the rod between the coupling section (keyway) and its end.

Because of the ease with which the extent of the coupling may be varied in the manner previously described, this connector is appealing because it eliminates the need to adjust the intensity of the optical signal passing down the fiber to adjust the intensity of the detected signal (maximize the detector response). For example, the fiber may simply be pulled back or cut off so that it encounters only four of the five protrusions on the key, thereby lowering the coupled intensity. This may be particularly useful in, e.g., optical fiber CATV distribution as it requires only one craftsman to install the termination and adjust the intensity of the detected signal.

FIG. 6 shows a tap for a buffered optical fiber similar to that disclosed in the Beals et al. application referred to previously, but employing the coupler of this invention.

The body 110 of the tap has a slot in which slides (in the direction of the arrows A) a key 138 having protrusions 140. [The reference numerals have been chosen so that analogus parts of the terminator and tap have numerals which differ by 100]. The key 138 in this case will generally be movable by a solenoid or similar actuating means (not shown) so that when it is not urged against the fiber to cause optical coupling the fiber will be unbent and will show no attenuation.

Backing means 114 and rod 116 perform in the manner described for the terminator. In this instance the end of rod 116 which carries the coupled light abuts against a detector 152 which may be connected to a data processor, etc. by a signal line (not shown).

The buffered fiber 122, after passing through the coupler as described above then passes through a transmitter section comprising a macrobend inducing means shown as rod 154 and a signal injecting means shown as a light source 156 and coupling means 158. Although it is believed that the single macrobend of the transmitter section causes no substantial attenuation of the light which may be passing down the fiber 122, it is possible to have the transmitter section open and close (such as by movement of source 156 and coupling means 158 in the direction of the arrows B) to minimize the extent of the bending when the transmitter section is not being used.

A signal passing down optical fiber 122 from end 160 may be not only coupled into rod 116, but may also be so attenuated by the coupler that essentially no signal is being carried by the fiber by the time it reaches the transmitter section. This may be desirable when the tap is used as a node in a ring network, in which each mode receives and regenerates the signal when it is actively connected into the circuit.

While the coupler of this invention has been described in detail with respect to certain aspects, especially signal detection rather than signal transmission, and certain principal embodiments, such as a termination and an optical fiber tap, it is to be understood that the invention is not limited by this description but only by the claims which follow and their reasonable equivalents.

We claim:

1. A signal coupler for a buffered optical fiber which comprises:
    a terminator body having a keyway slot therein;
    a soft, transparent, polymeric rod of cross-section at least as great as a buffered fiber, the rod being disposed in the keyway slot;
    rigid backing means disposed adjacent the polymeric rod in the keyway slot;
    a rigid key having regularly spaced protrusions on a surface thereof inserted into the keyway slot in a vicinity of the rod to press the buffered fiber against the rod; and
    compression means for urging that surface of the key having the protrusions against the buffered fiber to force it into contact with the polymeric rod and induce optical coupling between the fiber and the rod.

2. The signal coupler of claim 1 which further comprises an optical detector adjacent one end of the rod to detect a signal coupled into the rod from the fiber.

3. The signal coupler of claim 1 which further comprises a light source adjacent one end of the rod to inject a signal into the rod for coupling into the fiber.

4. The signal coupler of claim 1 wherein the compression means additionally comprises means for varying the force exerted on the fiber.

5. The signal coupler of claim 1 wherein the backing means is of U-shaped cross-section and the rod lies at the bottom of the U.

6. The signal coupler of claim 5 wherein the backing means is polymeric and of a lower refractive index than the rod.

7. The signal coupler of claim 1 wherein the rod has a hardness of between 30 and 90 Shore A.

8. The signal coupler of claim 1 wherein the rod comprises a silicone.

9. The signal coupler of claim 1 wherein the backing means comprises a fluoropolymer.

10. The signal coupler of claim 1 which has a buffered optical fiber inserted therein.

11. A terminator for an optical fiber cable comprising a buffered optical fiber, which comprises:
    (i) a signal coupler for a buffered optical fiber which comprises:
    a terminator body having a keyway slot therein;
    a soft, transparent, polymeric rod of cross-section at least as great as the buffered fiber, the rod being disposed in the keyway slot;

rigid backing means disposed in the keyway slot; a rigid key having regularly spaced protrusions on a surface thereof inserted into the keyway slot in a vicinity of the rod to press the buffered fiber against the rod; and compression means for urging that surface of the key having the protrusions against the buffered fiber to force it into contact with the polymeric rod and induce optical coupling between the fiber and the rod; and (ii) means for terminating the cable in such a way that the buffered optical fiber enters the signal coupler.

12. A tap for a buffered optical fiber, the tap having an open position in which it does not operate on the fiber and a closed position in which it does operate on the fiber, comprising:

(i) a signal coupler for a buffered optical fiber which comprises:

a terminator body having a keyway slot therein;

a soft, transparent, polymeric rod of cross-section at least as great as the buffered fiber, the rod being disposed in the keyway slot;

rigid backing means disposed in the keyway slot; a rigid key having regularly spaced protrusions on a surface thereof inserted into the keyway slot in a vicinity of the rod to press the buffered fiber against the rod; and compression means for urging that surface of the key having the protrusions against the fiber to force it into contact with the polymeric rod and induce optical coupling between the fiber and the rod;

the coupler having an open position in which the compression means does not urge the key against the fiber and a closed position in which the compression means does urge the key against the fiber to induce optical coupling between the fiber and the rod;

(ii) detection means adjacent an end of the rod for detecting an optical signal which is coupled into the rod when the coupler is closed;

(iii) bending means through which the fiber passes; and (iv) injecting means for injecting an optical signal into the bent position of the fiber when it is maintained in a bent configuration by the bending means.

13. The tap of claim 12 in which the bending means and injecting means are movable relative to one another between an open position in which the fiber is not sharply bent and a closed position in which the fiber is relatively sharply bent to enable the injecting means to inject an optical signal into the fiber.

14. The tap of claim 13 which further comprises a coupling means which, when the bending means and injecting means are in the closed position, will (a) conform to the surface of the fiber, (b) lie in the path of an optical signal from the injecting means, and (c) increase the proportion of an optical signal from the injecting means which is coupled into the fiber.

15. The tap of claim 14 wherein the coupling means comprises a resiliently deformable material.

16. The tap of claim 13 wherein the bend radius of a fiber when the bending means and injecting means are in the closed position is 1.5 to 15 mm.

17. The signal coupler of claim 1 wherein the spacing between the protrusions of the key surface is 0.5 to 5 mm.

18. The signal coupler of claim 17 wherein the spacing between the protrusions is 1.0 to 2.5 mm.

* * * * *